Aug. 19, 1958
E. H. GATZERT
2,848,548
CONFERENCE CIRCUIT
Filed Dec. 1, 1955
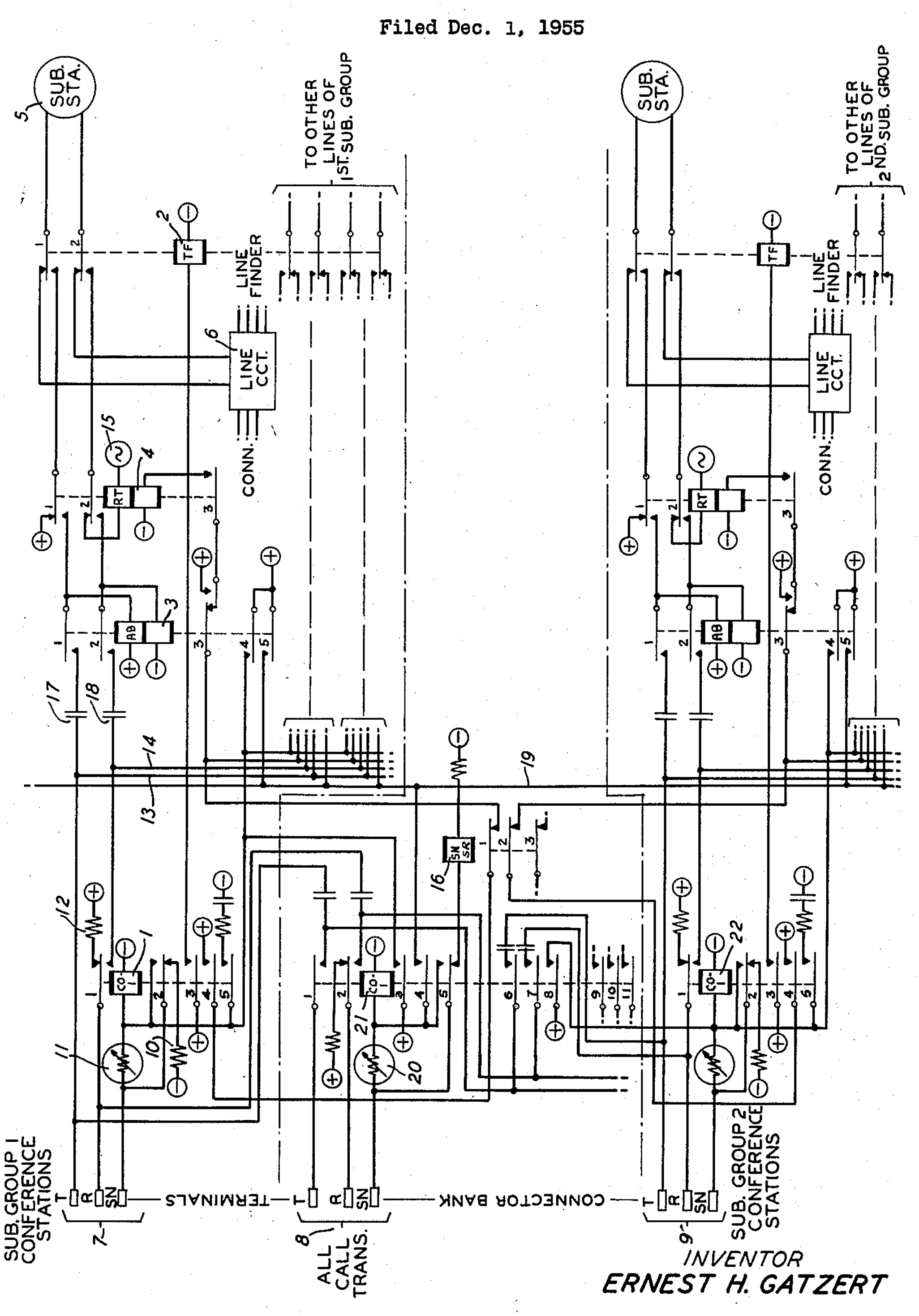
INVENTOR
ERNEST H. GATZERT
BY Francis E. Blake
ATTORNEY United States Patent Office 2,848,548

Patented Aug. 19, 1958

2,848,548

CONFERENCE CIRCUIT

Ernest H. Gatzert, Rochester, N. Y., assignor to General Dynamics Corporation, a corporation of Delaware Application December 1, 1955, Serial No. 550,387

8 Claims. (Cl. 179—18)

This invention relates to telecommunication systems and particularly to means in a telephone system for establishing a conference connection.

The object of the invention is to provide means for recalling subscribers whose substations are arranged for conference service while the conference is still in progress but who may have hung up.

It is conventional in conference calling to forcibly appropriate the lines of those whose substations are arranged for conference service and to add them to the conference circuit despite the fact that such subscribers may be busy at the time. Generally also it is arranged that the subscribers to the conference circuit may hang up at any time without being disturbed thereafter.

In accordance with the present invention, conference service is provided for a plurality of groups and each group may hold a conference independently of the others. In addition, a master circuit is provided by which the conferees of all said groups may be brought together and here means is provided to go in over a busy condition of a sub-group somewhat in the same manner as the individual subscribers had been forcibly added to a conference heretofore. Additionally, means is now provided for recalling any subscriber to a busy sub-group conference who may have left such conference and hung up.

A feature of the invention is a means in a major group conference circuit for releasing a locked ringing trip relay individual to a line embraced in a minor group of lines, each of which minor groups is embraced in said major group as a part thereof. By such means when a major group conference call is made even those subscribers embraced within a minor group which is busy and who have hung up, may be recalled.

Within each minor group conference call circuit each line is provided with a relay responsive to the answer of the called subscriber thereon which will lock and then remain locked until the last party in the conference has withdrawn. If such party leaves the conference before it is over his bell will not ring again unless a major group conference is called, but his line will still be connected to the conference circuit so that should he lift his telephone before the (minor group) conference is over, he will again be added to this minor group conference.

A feature of the invention is a circuit arrangement whereby every subscriber whose station is associated with a minor group conference circuit will be exclusively held to the conference arrangement either within his own minor group or within the major group until the last party in the conference has withdrawn, there being no exception to this rule.

Another feature of the invention is the provision of means for simultaneously carrying on a plurality of minor group conferences, each independent of the others, together with means for merging all into a single major group conference.

Another feature of the invention is the use of a relay individual to each said minor group and a similar relay individual to each major group. Any subscriber establishing a conference call will cause the operation of such a relay and will have his line extended to a common talking circuit. Should such subscriber be not one of those included in the conference arrangement, he will be connected to the conference circuit only as long as he maintains the established connection to the said common relay, but if he hangs up, he will not be able to re-enter the conference. If, however, his line is one of those arranged for the conference, then his line will be appropriated by the conference circuit and his original connection to the said individual conference relay will be released after the holding of such relay by his appropriated line has been assured. A feature of the invention then may be stated as a means in a conference circuit system for substituting one conference holding circuit for another when a party establishing such conference connection is one included among the predetermined parties to such conference connection.

Other features will appear hereinafter.

The drawings consist of a single sheet having a single figure in the form of a schematic circuit diagram showing the organization of two sub-groups of conference lines and a means to bring all the lines of all the sub-groups together in a major group.

Several subscribers' lines each connected to its line circuit through the contacts of a TF relay individual to a given sub-group are shown. A sub group thus consists of a sub group relay, such as the CO–1 relay 1 and the TF relay 2, each individual to the sub-group and a plurality of subscriber line circuits. Each of these has its individual battery feed relay such as the AB relay 3 and its ring cut off relay such as the RT relay 4. The subscriber line and station 5 is normally connected through the contacts of the sub-group relay 2 to its own line circuit 6 from which connections extend into the connector banks from which the substation may be reached and into the line finders over which the line may be extended to any called line.

Thus the subscriber at station 5 may establish connections by the conventional means to any point reached by the connectors provided, including the lines reached over the connector bank terminals 7, 8 and 9.

Let us assume that some other substation line than one of those within the sub-group including the station 5 sets up a connection to the connector bank terminals 7 in order to reach that sub-group of conference call stations. Upon seizure of this group of terminals the sleeve (SN) will be grounded and a connection will be established leading in one direction through armature 2 and back contact of relay 1, resistor 10 to battery and in a parallel branch circuit through thermistor 11, and the winding of relay 1 to battery. The thermistor 11 is placed in this circuit to render the relay 1 slow to respond in order to allow sufficient time for tripping the ringing in the connector used to establish this connection, which is accomplished through the normally established circuit from ground (+ battery) resistor 12 and the back contact and armature 1 of relay 1 to the ring of the line. The ring cut off relay in the connector will be tripped in the conventional manner and the talking circuit from the calling line to the connector bank terminals 7 will be established. Upon the delayed operation of relay 1 these talking conductors will be extended to the tip and ring conductors 13 and 14 of the conference circuit.

Upon the operation of the relay 1, ground will be extended over armature 3 and front contact of relay 1 and thence through the winding of TF relay 2 so that all the subscribers' lines of this particular sub-group, whether busy or idle, will immediately be cut off from their line circuits and connected in to the conference circuit. If a line such as that leading to station 5 is busy, then a connection will be established from ground, back contact and armature 1 of ring cut off relay 4, front contact and armature 1 of TF relay 2, substation 5, armature 2 and front contact of TF relay 2, armature 2 and back contact of ring cut off relay 4, the upper winding thereof to a source of ringing current 15. This will cause the immediate operation of the ring cut off relay 4 and the extension of the line of substation 5 to the windings of the battery feed relay 3. Upon the operation of the ring cut off relay 4, a locking circuit is established therefor from battery, the lower winding thereof, the front contact and armature 3 thereof, the back contact and armature 3 of the battery feed relay 3, the back contact and armature 1 of the slow releasing SN relay 16, armature 4 and front contact of relay 1 to ground. Upon the immediate operation of the AB battery feed relay 3, a local substitute for this ground is provided by the front contact of relay 3.

If the substation 5 is idle, the operations above described will be the same except that the ring cut off relay will not operate until the subscriber thereon answers. Upon the operation of the battery feed relay 3, the line of substation 5 will be connected through condensers 17 and 18 to the tip and ring conference circuit conductors 13 and 14.

If the subscriber at substation 5 retires before the conference is over, his battery feed relay 3 will release and will cut his line off from the conference circuit but the ring cut off relay 4 will remain locked over the circuit first described. The subscriber at substation 5 may rejoin the conference at any time but he may not use his line for other purposes as long as relay 2 is operated, that is as long as any party to the conference is still active. It may be noted that a locking circuit is provided from ground, armature 4 and front contact of the AB relay 3 to the winding of relay 1 and since each party to the conference is provided with such a connection the relay 1 will remain operated until the last party to the conference retires.

It may be noted that if the subscriber at substation 5 is the party who makes the conference call by setting up a connection to the connector terminals 7, his line will be immediately cut off from the facilities he had used to establish the connection and that those switches including the connector used to reach the terminals 7 will be released. However, the slow releasing relays in the connector will hold this connection until this subscriber's AB relay 3 can have operated and established the holding connection for relay 1.

The subscriber at substation 5 cannot be recalled within his own subgroup conference circuit. However, if after he has hung up, an All Call conference is set up, he will be recalled. The All Call circuit is established by a connection set up to the connector terminals 8. Upon the establishment of such a connection the group applied to the sleeve will be extended over armature 5 and back contact of relay 21 and thence through the winding of relay 16 to battery, thus operating this slow releasing relay 16 until the thermistor 20 has warmed up sufficiently to allow the operation of the relay 21. During this short period the holding circuits for all the ring cut off relays such as the relay 4 on lines which have retired from established conferences will be opened so that the ring cut off relays of such lines will be released and the subscribers thereon will be recalled.

Each AB relay, such as relay 3, upon operation will establish a holding circuit from ground, armature 5 and front contact of the AB relay 3 to the common conductor 19 leading over the front contact and armature 4 of relay 21 to the winding thereof so that when an All Call connection is established it will be held until the last subscriber in any one of the sub-groups retires.

It will be apparent that the All Call relay upon operation will cause the operation of each of the sub-group relays. Relay 1 will be operated over armature 3 of relay 21 and relay 22 will be operated over armature 8 of relay 21. It will also be apparent that the talking circuits of all the sub-groups will be tied together through the contacts of relay 21.

What is claimed is:

1. In a telephone system, a plurality of subscriber lines each having a conventional line circuit arrangement included in a conference group, a relay common to said lines and individual to said group, a conference circuit individual to each of said lines, means responsive to the initiation of a conference call for said conference group for operating said common relay, a cut-through relay common to said lines and individual to said group having means for disconnecting each said line from its said line circuit arrangement and for alternatively connecting each said line to its said conference circuit, a ringing circuit individual to each conference circuit, means controlled in response to the operation of said cut-through relay for connecting said ringing circuits to the corresponding lines to signal the subscribers thereat, a ring cut-off relay in each conference circuit operated in response to each subscriber answering said signal for disconnecting said ringing circuit, a battery feed relay individual to each conference circuit, said battery feed relay operated in response to the operation of its corresponding ring cut-off relay for feeding talking battery to the corresponding line, a circuit in each said conference circuit controlled by said battery feed relay therein for maintaining said common relays operated, and an individual locking circuit for each said ring cut-off relay controlled by its said associated battery feed relay extending during the operation of said battery feed relay individually therefrom and alternatively during release of said battery feed relay from said common relay.

2. A telephone system as claimed in claim 1, in which a plurality of conference call circuits as set forth are provided each operating independently of the others and capable of simultaneous or overlapping operation.

3. A telephone system as claimed in claim 2, characterized by the provision of a master group relay having means for operating said common relay of each of said conference call circuits and means for multiplying all said conference circuits to a common talking path.

4. A telephone system as claimed in claim 3, in which said master group relay is commonly controlled by all said subscribers' lines of all said plurality of conference call circuits.

5. A telephone system as claimed in claim 3, in which means associated with said master group relay is provided to open the said locking circuits of any of said ring cut-off relays individual to a line within a busy conference call circuit which has retired and released its said battery feed relay.

6. A telephone system as claimed in claim 5, in which means is provided to transiently operate said means for opening said locking circuits.

7. A telephone system as claimed in claim 1, in which a subscriber either within or without the group comprising said conference group is provided with means to extend a connection to and operate said common relay, characterized in this that where a subscriber included within said group causes the operation of said common relay, said subscriber's line will be cut off from such established connection and added to said conference circuit whereby the said battery feed relay individual to said subscriber's line will immediately operate to hold said common relay operated for the duration of the conference.

8. In a telephone system, a plurality of subscribers' lines divided into a plurality of sub-groups, a sub-group relay for each of said sub-groups, means responsive to the operation of a sub-group relay for connecting each of said associated lines to a conference circuit connection including a common talking circuit, an individual battery feed relay and an individual ringing relay, a locking circuit for said ringing relays, a master relay common to all said sub-groups, said master relay having means to open said ringing relay locking circuits for said ringing relays in all said sub-groups, and a thermistor for limiting the operation of said master relay to a transistory period.

References Cited in the file of this patent

UNITED STATES PATENTS

| | | |
|---|---|---|
| 2,374,357 | Kiner | Apr. 24, 1945 |
| 2,375,678 | Newstedt | May 8, 1945 |
| 2,658,110 | Lomax | Nov. 3, 1953 |

UNITED STATES PATENT OFFICE

CERTIFICATE OF CORRECTION

Patent No. 2,848,548 August 19, 1958

Ernest H. Gatzert

It is hereby certified that error appears in the printed specification of the above numbered patent requiring correction and that the said Letters Patent should read as corrected below.

Column 3, line 54, for "group" read -- ground --.

Signed and sealed this 3rd day of March 1959.

(SEAL)

Attest:

KARL H. AXLINE
Attesting Officer

ROBERT C. WATSON
Commissioner of Patents